(12) United States Patent
Umemoto et al.

(10) Patent No.: US 7,202,652 B2
(45) Date of Patent: *Apr. 10, 2007

(54) MOTOR DRIVING APPARATUS INCORPORATING SWITCH DEVICE DRIVING APPARATUS

(75) Inventors: Kiyotaka Umemoto, Kyoto (JP); Ko Takemura, Mukou (JP)

(73) Assignee: Rohm Co, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,525

(22) Filed: Mar. 9, 2005

(65) Prior Publication Data

US 2005/0179425 A1   Aug. 18, 2005

Related U.S. Application Data

(63) Continuation-in-part of application No. 10/460,219, filed on Jun. 13, 2003, now Pat. No. 6,954,055.

(30) Foreign Application Priority Data

Jun. 13, 2002   (JP) .............................. 2002-172938

(51) Int. Cl.
   G05F 1/40      (2006.01)
   H02P 23/00    (2006.01)

(52) U.S. Cl. ...................... 323/284; 323/285; 318/812

(58) Field of Classification Search ................ 323/222, 323/282, 283, 284, 285, 288, 290, 351; 318/727, 318/812

See application file for complete search history.

(56) References Cited

U.S. PATENT DOCUMENTS

| 4,455,526 | A  |   | 6/1984 | Miller |
| 4,736,151 | A  |   | 4/1988 | Dishner |
| 4,910,416 | A  |   | 3/1990 | Salcone |
| 5,757,173 | A  |   | 5/1998 | Agiman |
| 6,781,354 | B2 | * | 8/2004 | Zhang .......................... 323/284 |
| 2003/0141856 | A1 | * | 7/2003 | Kimura ....................... 323/282 |

FOREIGN PATENT DOCUMENTS

| EP | 0 860 946 A2 | 8/1998 |
| JP | 06-253537    | 9/1994 |
| JP | 2000-092824  | 3/2000 |

* cited by examiner

*Primary Examiner*—Jessica Han
(74) *Attorney, Agent, or Firm*—Arnet Fox PLLC

(57) ABSTRACT

A motor driving apparatus which includes a pair of field-effect transistors connected in series between a first supply voltage and a second supply voltage lower than the first supply voltage, an output smoothing circuit connected to a node between the two field-effect transistors, a driver for controlling on/off states of the field-effect transistors according to an input signal, and a detector for detecting on/off states of body diodes attached respectively to the field-effect transistors. Only after either of the body diodes is detected being on are the field-effect transistors respectively turned on to produce an output corresponding to the input signal so as to eventually produce a desired output voltage from the first supply voltage.

4 Claims, 2 Drawing Sheets

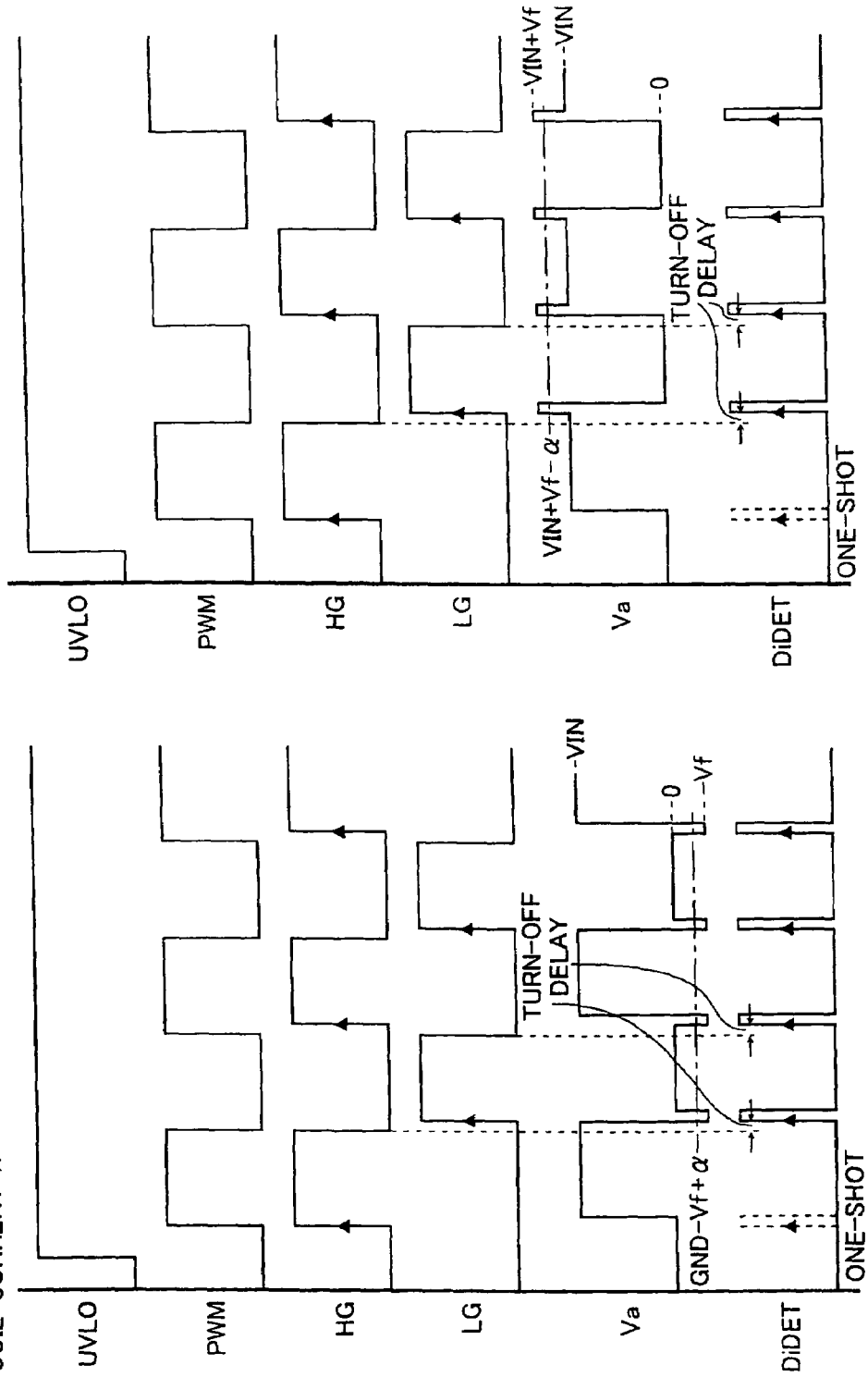

__US 7,202,652 B2__

MOTOR DRIVING APPARATUS INCORPORATING SWITCH DEVICE DRIVING APPARATUS

This is a Continuation-in-Part of application Ser. No. 10/460,219 filed Jun. 13, 2003 now U.S. Pat. No. 6,954,055. The disclosure of the prior application is hereby incorporated by reference herein in its entirety.

BACKGROUND OF THE INVENTION

1. Field of the Invention

The present invention relates to a driving apparatus for controlling the switching operation of a pair of field effect transistors (hereinafter FETs) connected in series between two different potentials to function as switching devices. The present invention relates also to a motor driving apparatus employing such a driving apparatus.

2. Description of the Prior Art

A synchronous-rectification motor driving apparatus has a pair of FETs connected in series between two different potentials (between an input potential and a ground potential) to function as switching devices for achieving synchronous rectification, and a desired voltage is output from the node between the two FETs through an LC filter. Such a synchronous-rectification motor driving apparatus incorporates an FET driving apparatus for controlling the switching operation of the FETs, and this driving apparatus is provided with a function for preventing the two FETs from being turned on simultaneously. This is because, if a flow-through current flows through the two FETs, it may destroy them, or lower conversion efficiency.

One way to prevent the two FETs from being turned on simultaneously is to secure a period in which both FETs are simultaneously off by delaying the timing with which one FET is turned from off to on relative to the timing with which the other FET is turned from on to off so that the two FETs are not switched on or off until the end of that "simultaneously-off" period. To achieve this, a conventional FET driving apparatus adopts one of the techniques of (1) forming a delay circuit including a CR time constant circuit and a plurality of inverters, (2) varying the slice level of a triangular wave used to produce the gate voltages, (3) controlling one gate voltage according to the result of monitoring the other gate voltage, and (4) controlling the gate voltages according to the result of monitoring the coil terminal voltage and the gate voltage of the low-side FET (U.S. Pat. No. 5,757,173). All these techniques help secure a period in which both FETs are simultaneously off.

It is true that, to a certain extent, an FET driving apparatus configured as described above serves to prevent the two FETs from being turned on simultaneously.

However, in an FET driving apparatus adopting the technique (1) or (2) above, a predetermined length of time is previously secured as the simultaneously-off period without monitoring whether the FETs are on or off. Thus, to securely prevent the two FETs from being turned on simultaneously, quite inconveniently, it is necessary to optimize the length of the simultaneously-off period for the particular FETs actually driven. In particular, in a case where the FETs actually driven are externally fitted ones (as in a large-current motor driving apparatus), variations in their characteristics and type are completely independent of variations in those of the IC built in the FET driving apparatus. This makes it inevitable to add an ample margin to the simultaneously-off period, leading to lower conversion efficiency.

In an FET driving apparatus adopting the technique (3) or (4) above, whether the FETs are on or off is detected according to their gate voltages. Thus, no consideration is given to the turn-on/off delay of the FETs (i.e., the delay that occurs after the gate voltages are varied until a change appears in the output voltage). As a result, despite the monitoring of the gate voltages, quite inconveniently, it is all the same necessary to optimize the length of the simultaneously-off period for the particular FETs actually driven. The aforementioned turn-on/off delay varies greatly from one FET to another, and is therefore given, in general, not as an actual value but only as a typical value (maximum value) in the specifications of FETs. Accordingly, even when the length of the simultaneously-off period is determined on the basis of what is stated in the specifications of a given type of FET, in reality, unduly low conversion efficiency may result. For example, in a case where the actual value is 30 [nm] while the typical value is 200 [ns], the two FETs are unnecessarily kept simultaneously off for as long as 170 [ns].

Furthermore, an FET driving apparatus adopting the technique (4) above functions properly only in a case where, when both FETs are simultaneously off, a current flows through the coil in a positive direction (i.e., from ground to the output terminal). That is, quite inconveniently, such an FET driving apparatus does not function properly in a case where, when both FETs are simultaneously off, a current flows through the coil in a negative direction (i.e., from the output terminal to ground). This is because, in that case, the body diode attached to the high-side FET is on, and thus causes the coil terminal voltage to remain close to the input voltage. This type of FET driving apparatus is thus unusable in a motor driving apparatus for supplying electric power to a load that requires the direction of the coil current to be switched during operation (such as a variable-supply-voltage IC or DDR-SDRAM (double-data-rate synchronous dynamic random-access memory)).

SUMMARY OF THE INVENTION

An object of the present invention is to provide a switching device driving apparatus that securely prevents two FETs from being turned on simultaneously independently of their characteristics and type, and to provide a motor driving apparatus employing such a driving apparatus.

To achieve the above object, according to the present invention, a switching device driving apparatus is provided with: a driver for controlling, according to an input signal, the on/off states of a pair of field-effect transistors connected in series between a first supply voltage and a second supply voltage lower than the first supply voltage; and a detector for detecting the on/off states of body diodes attached respectively to the field-effect transistors. Here, only after either of the body diodes is detected being on are the field-effect transistors respectively turned on to produce an output corresponding to the input signal.

BRIEF DESCRIPTION OF THE DRAWINGS

This and other objects and features of the present invention will become clear from the following description, taken in conjunction with the preferred embodiments with reference to the accompanying drawings in which:

FIGS. 2A and 2B are timing charts showing the voltage waveforms observed at relevant points in the FET driving apparatus 1.

DESCRIPTION OF THE PREFERRED EMBODIMENTS

Figure 1:
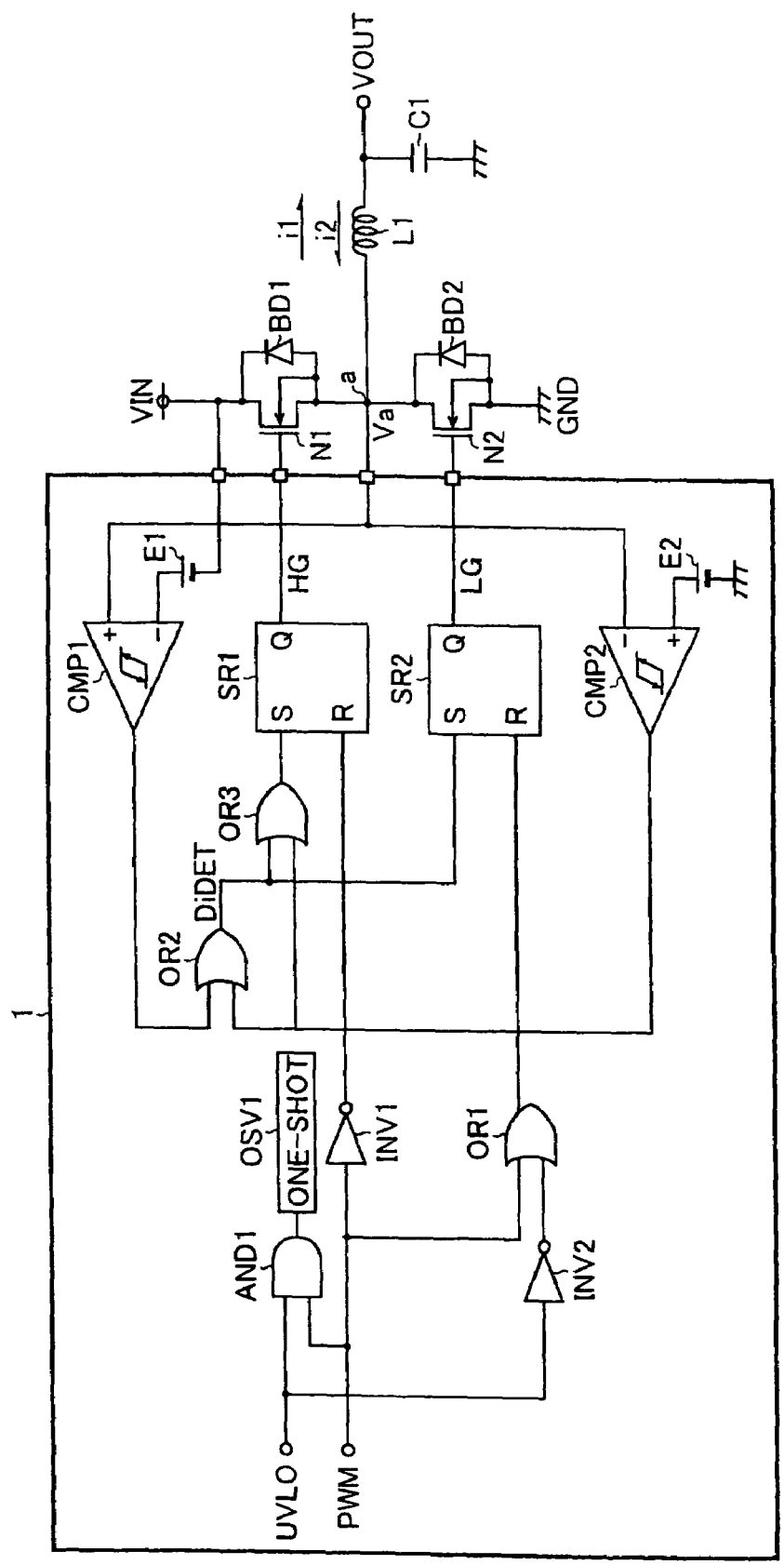
FIG. 1 is a circuit diagram of a synchronous-rectification motor driving apparatus incorporating an FET driving apparatus embodying the invention.

FIG. 1 is a circuit diagram of a synchronous-rectification motor driving apparatus incorporating an FET driving apparatus embodying the invention. As shown in this figure, the synchronous-rectification motor driving apparatus of this embodiment has a pair of N-channel MOS FETs N1 and N2 (hereinafter referred to as the FETs N1 and N2) connected in series between two different potentials (between an input potential VIN and a ground potential GND) to function as switching devices for achieving synchronous rectification. A desired output voltage VOUT is obtained from the node between the FETs N1 and N2 through an LC filter (composed of a coil L1 and a capacitor C1).

The drain of the FET N1 is connected to a supply voltage line, and the source of the FET N2 is grounded. The source of the FET N1 and the drain of the FET N2 are connected together, and their node "a" is connected to one end of the coil L1. The other end of the coil L1 is connected to an output terminal, and is grounded through the capacitor C1. The FETs N1 and N2 respectively have body diodes BD1 and BD2 (hereinafter referred to as the diodes BD1 and BD2) attached between their source and drain (more precisely, between their backgate and drain).

The switching operation of the FETs N1 and N2 is controlled by an FET driving apparatus 1. This FET driving apparatus 1 exploits the fact that either of the diodes BD1 and BD2 (depending on the current that flows through the coil) is on when both FETs N1 and N2 are simultaneously off, and is so configured as to turn on one of the FETs N1 and N2 on detecting that the corresponding diode BD1 or BD2 is on.

Specifically, in this embodiment, the FET driving apparatus 1 includes reset-priority SR flip-flops SR1 and SR2, comparators CMP1 an CPM2 (in this embodiment, high-speed comparators with hysteresis), direct-current voltage sources E1 and E2, inverters INV1 and INV2, a one-shot vibrator OSV1, an AND circuit AND1, and OR circuits OR1, OR2, and OR3.

A PWM (pulse-width modulation) signal for driving the FETs N1 and N2 is fed in via a PWM input terminal, which is connected, on one hand, through the inverter INV1 to the reset terminal (R) of the flip-flop SR1 and, on the other hand, directly to one input terminal of the AND circuit AND1 and to one input terminal of the OR circuit OR1.

A UVLO (undervoltage lockout) signal for preventing malfunctioning due to an undervoltage is fed in via a UVLO input terminal, which is connected to the other input terminal of the AND circuit AND1. The output terminal of the AND circuit AND1 is connected to the input terminal of the one-shot vibrator OSV1. The UVLO input terminal is also connected through the inverter INV2 to the other input terminal of the OR circuit OR1. The output terminal of the OR circuit OR1 is connected to the reset terminal (R) of the flip-flop SR2.

The non-inverting input terminal (+) of the comparator CMP1 is connected to the node "a," and the inverting input terminal (−) of the comparator CMP1 is connected to the positive terminal of the direct-current voltage source E1. The negative terminal of the direct-current voltage source E1 is connected to the supply voltage line. The direct-current voltage source E1 is so set as to produce a voltage lower by a predetermined voltage α (for example, 0.3 [V]) than the on-state voltage Vf (for example, 0.7 [V]) across the diode BD1. Thus, the comparator CMP1 compares the voltage Va at the node "a" with a threshold voltage VIN+Vf−α. This permits quicker and securer detection of the on state of the diode BD1.

The inverting input terminal (−) of the comparator CMP2 is connected to the node "a," and the non-inverting input terminal (+) of the comparator CMP2 is connected to the positive terminal of the direct-current voltage source E2. The negative terminal of the direct-current voltage source E2 is grounded. The direct-current voltage source E2 is so set as to produce a voltage higher by the predetermined voltage α than the ground potential GND minus the on-state voltage Vf across the diode BD2. Thus, the comparator CMP2 compares the voltage Va with a threshold voltage GND−Vf+α. This permits quicker and securer detection of the on state of the diode BD2.

The output terminals of the comparators CMP1 and CMP2 are respectively connected to the two input terminals of the OR circuit OR2. The output terminal of the OR circuit OR2 is connected to one input terminal of the OR circuit OR3 and also to the set terminal (S) of the flip-flop SR2. The other input terminal of the OR circuit OR3 is connected to the output terminal of the one-shot vibrator OSV1, and the output terminal of the OR circuit OR3 is connected to the set terminal (S) of the flip-flop SR1. The output terminals (Q) of the flip-flips SR1 and SR2 are respectively connected to the gates of the FETs N1 and N2.

Next, the operation of the FET driving apparatus 1 configured as described above will be described. FIGS. 2A and 2B are timing charts showing the voltage waveforms observed at relevant points in the FET driving apparatus 1. While FIG. 2A shows the voltage waveforms observed in a case where, when both FETs N1 and N2 are simultaneously off, a current flows through the coil in a positive direction (from ground to the output terminal), FIG. 2B shows the voltage waveforms observed in a case where, when both FETs N1 and N2 are simultaneously off, a current flows through the coil in a negative direction (from the output terminal to the supply voltage line).

When the UVLO signal and the PWM signal are both low, the flip-flops SR1 and SR2 are kept in a fixed logic state by the inverted PWM signal and the inverted UVLO signal (both high) that they receive at their respective reset terminals (R).

After the supply of electric power to the FET driving apparatus 1 settles into a steady state and the UVLO signal shifts into an enabled state (turns high), when a first pulse appears in the PWM signal, the output of the AND circuit AND1 turns high, and causes the one-shot vibrator OSV1 to produce a start-up one-shot pulse. Accordingly, the flip-flop SR1, by using as a trigger the one-shot pulse fed to its set terminal (S) through the OR circuit OR3, sets its output signal HG high. This causes the FET N1 to turn on with a turn-on delay unique to that FET after the output signal HG has turned high. On the other hand, the flip-flop SR2 is reset by the PWM signal (high) fed to its reset terminal (R), and therefore its output signal LG is kept low. Thus, the FET N2 remains off. Through these operations, the voltage Va rises to become roughly equal to the input voltage VIN.

Thereafter, when the PWM signal falls low, the flip-flop SR1 is reset by the inverted PWM signal (high) fed to its reset terminal (R) through the inverter INV1, and thus its output signal HG turns low. This causes the FET N1 to turn off with a predetermined turn-off delay after the output signal HG has turned low. Now, the FETs N1 and N2 are simultaneously off.

In this state, if the coil current is flowing in the positive direction i1, the diode BD2 is on. Thus, the voltage Va is lower than the ground voltage GND by the on-state voltage Vf across the diode BD2, and is therefore lower than the threshold voltage GND−Vf+α of the comparator CMP2. Accordingly, the output signal of the comparator CMP2 is high. By contrast, if the coil current is flowing in the negative direction i2, the diode BD1 is on. Thus, the voltage Va is higher than the input voltage VIN by the on-state voltage Vf across the diode BD1, and is therefore higher than the threshold voltage VIN+Vf−α of the comparator CMP1. Accordingly, the output signal of the comparator CMP1 is high.

When either of the output signals of the comparators CMP1 and CMP2 is high as described above, the output signal DiDET of the OR circuit OR2 is high. Accordingly, the flip-flop SR2, by using as a trigger the output signal DiDET fed to its set terminal (S), sets its output signal LG high. This causes the FET N2 to turn on with a turn-on delay unique to that FET after the output signal LG has turned high, and this in turn causes the output signal DiDET to return to low. On the other hand, the flip-flop SR1 is kept in a fixed logic state by the inverted PWM signal (high) fed to its reset terminal (R), and therefore, even though the output signal DiDET fed to its set terminal (S) is high, keeps its output signal HG low. Thus, the FET N1 remains off. Through these operations, the voltage Va becomes roughly equal to the ground voltage GND.

Thereafter, when the PWM signal rises high, the flip-flop SR2 is reset by the PWM signal (high) fed to its reset terminal (R), and thus its output signal LG turns low. This causes the FET N2 to turn off with a turn-off delay time unique to that FET after the output signal LG has turned low. Now, the FETs N1 and N2 are simultaneously off.

In this state, if the coil current is flowing in the positive direction i1, the voltage Va is lower than the threshold voltage GND−Vf+α of the comparator CMP2, and thus its output is high. By contrast, if the coil current is flowing in the negative direction i2, the voltage Va is higher than the threshold voltage VIN+Vf−α of the comparator CMP1, and thus its output is high. Accordingly, the output signal DiDET of the OR circuit OR2 is high, and thus the flip-flop SR1, by using as a trigger the output signal DiDET fed to its set terminal (S), sets its output signal HG high. This causes the FET N1 to turn on with a turn-on delay unique to that FET after the output signal HG has turned high, and this in turn causes the output signal DiDET to return to low. On the other hand, the flip-flop SR2 is kept in a fixed logic state by the PWM signal (high) fed to its reset terminal (R), and therefore, even through the output signal DiDET fed to its set terminal (S) is high, keeps its output signal LG low. Thus, the FET N2 remains off. Through these operations, the voltage Va becomes roughly equal to the input voltage VIN. Thereafter, the same sequence of operations is repeated.

In this way, in the FET driving apparatus 1 of this embodiment, instead of previously setting a predetermined length of dead time to secure a period in which both FETs N1 and N2 are simultaneously off, the fact that, when both FETs N1 and N2 are simultaneously off, either of the diodes BD1 and BD2 is on is exploited, and either of the FETs N1 and N2 is turned on detecting that the corresponding diode BD1 or BD2 is on. With this configuration, even when there are variations in the specifications of the externally fitted FETs N1 and N2, it is possible to securely prevent them from being turned on simultaneously and thereby realize a safe power supply.

Moreover, in the FET driving apparatus 1 of this embodiment, it is possible to minimize the length of the period in which both FETs N1 and N2 are simultaneously off. Thus, it is possible to greatly reduce the loss that occurs in the diodes BD1 and BD2 in the simultaneously-off period and thereby achieve conversion efficiency optimized for the particular FETs actually driven.

Furthermore, with the FET driving apparatus 1 of this embodiment, it is possible to prevent the two FETs N1 and N2 from being turned on simultaneously irrespective of the direction of the coil current that flows when both FETs are simultaneously off. This makes the FET driving apparatus 1 usable in a motor driving apparatus that supplies electric power to a load that requires the direction of the coil current to be switched during operation.

The embodiment described above deals with an example in which an FET driving apparatus embodying the invention is applied to a synchronous-rectification motor driving apparatus, but the present invention is applicable not only to that particular type of apparatus but also widely to driving apparatuses in general for controlling the switching operation of a pair of field-effect transistors connected in series between two different potentials to function as switching devices.

The embodiment described above deals with an example in which the FETs driven are both N-channel FETs, but the present invention may be carried out in any other configuration. For example, needless to say, even with one or both of those FETs replaced with a P-channel FET, optimum driving can be achieved on the same principle. The FETs may be formed on the same semiconductor chip as the FET driving apparatus itself.

FIGS. 2A and 2B illustrate a case in which the coil current varies in either of the positive and negative directions at a time. In a case where the coil current varies in both of the positive and negative directions, the voltage Va exhibits a waveform as obtained when FIGS. 2A and 2B are superimposed on each other.

As described above, with a driving apparatus embodying the invention, it is possible to securely prevent two switching devices from being turned on simultaneously independently of their characteristics and type.

What is claimed is:
1. A motor driving apparatus comprising:
   a pair of field-effect transistors connected in series between a first supply voltage and a second supply voltage lower than the first supply voltage;
   an output smoothing circuit connected to a node between the two field-effect transistors;
   a driver for controlling on/off states of the field-effect transistors according to an input signal;
   a detector for detecting on/off states of body diodes attached respectively to the field-effect transistors,
   wherein only after either of the body diodes is detected being on are the field-effect transistors respectively turned on to produce an output corresponding to the input signal so as to eventually produce a desired output voltage from the first supply voltage.
2. A motor driving apparatus as claimed in claim 1, wherein the detector includes:
   a first comparator for comparing a target voltage obtained at a node between the two field-effect transistors with a first threshold voltage higher than the first supply voltage but lower than the first supply voltage plus an on-state voltage across the body diodes; and a second comparator for comparing the target voltage with a second threshold voltage lower than the second supply voltage but higher than the second supply voltage minus the on-state voltage across the body diodes, wherein only after the target voltage is detected being higher than the first threshold voltage or lower than the second threshold voltage based on output signals of the first and second comparators is that one of the field-effect transistors which has been off up to now turned on to correspond to the input signal.

3. A motor driving apparatus as claimed in claim 2, wherein the first and second comparators are high-speed comparators with hysteresis.

4. A motor driving apparatus as claimed in claim 1, wherein the motor driving apparatus supplies electric power to a load that requires a direction of a current that flows through the output smoothing circuit to be switched during operation.

\* \* \* \* \*